(12) United States Patent
Cohen et al.

(10) Patent No.: US 9,390,107 B2
(45) Date of Patent: *Jul. 12, 2016

(54) SYSTEM AND METHOD FOR AUTOMATICALLY CREATING A PHOTO CALENDAR

(71) Applicant: Shutterfly, Inc., Redwood City, CA (US)

(72) Inventors: Eran Cohen, Haifa (IL); Alexander M. Kenis, Kiryat Motzkin (IL); Moshe Bercovich, Haifa (IL)

(73) Assignee: SHUTTERFLY, INC., Redwood City, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/301,141

(22) Filed: Jun. 10, 2014

(65) Prior Publication Data

US 2014/0297645 A1    Oct. 2, 2014

Related U.S. Application Data

(63) Continuation of application No. 13/674,790, filed on Nov. 12, 2012, now Pat. No. 8,805,124, which is a continuation-in-part of application No. 13/520,325, filed as application No. PCT/IL2011/000167 on Feb. 17, 2011, now Pat. No. 8,861,897.

(60) Provisional application No. 61/305,157, filed on Feb. 17, 2010.

(51) Int. Cl.
*G06K 9/54* (2006.01)
*G06K 9/60* (2006.01)
*G06F 17/30* (2006.01)

(52) U.S. Cl.
CPC ...... *G06F 17/30268* (2013.01); *G06F 17/3028* (2013.01); *G06F 17/30064* (2013.01)

(58) Field of Classification Search
None
See application file for complete search history.

(56) References Cited

U.S. PATENT DOCUMENTS

| 5,331,550 | A | 7/1994 | Stafford |
| 6,718,063 | B1 | 4/2004 | Lennon |
| 7,467,222 | B2* | 12/2008 | Kacker ......................... 709/232 |
| 8,041,154 | B2* | 10/2011 | Ohwa ......................... 382/305 |
| 2003/0048950 | A1 | 3/2003 | Savakis |
| 2004/0085578 | A1* | 5/2004 | Quek et al. ................. 358/1.18 |
| 2004/0101156 | A1* | 5/2004 | Kacker ......................... 382/100 |
| 2007/0239683 | A1 | 10/2007 | Gallagher |
| 2007/0239778 | A1* | 10/2007 | Gallagher ................. 707/104.1 |
| 2007/0271297 | A1* | 11/2007 | Jaffe et al. ................. 707/104.1 |
| 2008/0089593 | A1* | 4/2008 | Ohwa ......................... 382/225 |
| 2008/0162303 | A1* | 7/2008 | Moore et al. ..................... 705/27 |
| 2009/0022424 | A1* | 1/2009 | Chen et al. .................... 382/284 |
| 2009/0052736 | A1* | 2/2009 | Kacker ....................... 382/100 |
| 2009/0063557 | A1 | 3/2009 | MacPherson |
| 2009/0196510 | A1 | 8/2009 | Gokturk |
| 2009/0234707 | A1* | 9/2009 | Perez et al. ..................... 705/10 |

(Continued)

*Primary Examiner* — Utpal Shah
*Assistant Examiner* — Guillermo Rivera-Martinez
(74) *Attorney, Agent, or Firm* — Xin Wen

(57) ABSTRACT

System and method are disclosed for creating a photo calendar. A computer storage medium stores images taken in a time period spanning a plurality of capture months. A computer processor automatically divides the images into groups based the capture months, distributes the images in one of the capture month to one or more calendar months according to an adjacency distribution function, and creates a design of a photo calendar comprising a plurality of calendar months and images distributed in the calendar months.

17 Claims, 12 Drawing Sheets

(56) References Cited

U.S. PATENT DOCUMENTS

2009/0252429 A1 10/2009 Prochazka
2009/0287585 A1* 11/2009 Elarde et al. .................... 705/26
2010/0259544 A1* 10/2010 Chen et al. .................... 345/441

* cited by examiner

Calendar Months

| Capture Months | Jan | Feb | Mar | Apr | May | June | July | Aug | Sept | Oct | Nov | Dec |
|---|---|---|---|---|---|---|---|---|---|---|---|---|
| Jan | ▓ | ▓ | | | | | | | | | | |
| Feb | | | | | | | | | | | | |
| March | | ▓ | ▓ | | | | | | | | | |
| April | | ▓ | ▓ | ▓ | ▓ | ▓ | | | | | | |
| May | | | | | ▓ | | | | | | | |
| June | | | | | | ▓ | | | | | | |
| July | | | | | | | ▓ | | | | | |
| August | | | | | | ▓ | ▓ | ▓ | ▓ | | | |
| Sept | | | | | | | | | | | | |
| October | | | | | | | | | | ▓ | ▓ | |
| Nov | | | | | | | | | | | ▓ | |
| Dec. | | | | | | | | | | | | ▓ |

Figure 11

Layout 1 for January

Layout 2 for January

SYSTEM AND METHOD FOR AUTOMATICALLY CREATING A PHOTO CALENDAR

BACKGROUND OF THE INVENTION

Since digital cameras took the lead in the photography market, many users have problems in managing the huge amount of images stored on their computers, storage devices and/or online collections of images. The occasionally captured images are aggregated in the various storage forms and occupy considerable storage volume, while the amount of stored images complicates and reduces the ability to find of a certain photo among the huge amount of photos. Therefore, the process of selection of images among the huge amount of stored images, for example for printing or for producing an album or specific collection of images for sharing online, may be complicated, wearying and time consuming.

There are known methods for ranking images, such as ranking according to optical quality of images or ranking according to popularity of the images.

Additionally, there are known methods for identifying and clustering related images, for example for creating batches of images related to a certain event or period of time.

The known methods for ranking and for clustering sets of images may facilitate the management of image collections.

Users can also design image products using digital images. Such image products include photo books, photo calendars, photo greeting cards, photo stationeries, photo mugs, photo T-shirts, and so on. A photo book or a photo calendar can include a plurality of pages each containing one or more images. Designing a photobook or a photo calendar can include many iterative steps such as selecting suitable images, distributing images to different pages, selecting a style, layouts, and backgrounds, selecting design elements such as image borders, adding text, and so on, which can be quite time consuming.

There is therefore a need for a system and method which may automatically or semi-automatically select and organize collections of images out of an aggregation of stored images. It is also desirable to provide easy-to-use methods to allow users to design and produce image products in a time efficient manner.

SUMMARY OF THE INVENTION

The disclosed methods and systems provide more convenient ways for a user to obtain designs of image products such as photo calendars and photo books. Images can be automatically analyzed, ranked, clustered, and automatically arranged into an image product design without being asked by a user. The time and effort for a user to create and obtain an image product are significantly reduced. The user is provided with an option to review, to edit, and to request a physical copy of the image product to be made according to the design.

Furthermore, the disclosed systems and methods can significant increase the awareness of users in personalized image products. A user is given a chance to learn and visualize what an image product might look like before he or she realizes the existence or design possibilities of an image product. Users' memories can thus be better and more timely preserved.

In one general aspect, the present invention relates to a method for proactively creating an image product such as a photobook or photo calendar. The method includes identifying a group of images by a computer system; automatically creating a design for an image product by the computer system without receiving a user's request for designing the image product if the number of images in the group is determined to be within a predetermined range, wherein the image product incorporates one or more images in the group; presenting the design of the image product to a user for preview; and receiving an order from the user for a physical manifestation of the image product based on the design.

In one general aspect, the present invention relates to a computer-implemented method for creating a photo calendar. The computer-implemented method includes storing images in a computer storage, wherein the images are taken in a time period spanning a plurality of capture months; automatically dividing the images, by a computer processor, into groups based the capture months; automatically distributing the images in one of the capture month to one or more calendar months according to an adjacency distribution function; and automatically creating, by the computer processor, a design of a photo calendar comprising a plurality of calendar months and images distributed in the calendar months.

Implementations of the system may include one or more of the following. The one or more calendar months can be adjacent to the one of the capture month. The adjacency distribution function can decrease as a function of t, wherein t is difference between the capture time of an image and the calendar month that the image is distributed to. The adjacency distribution function can include a Gaussian function of t, or proportional to $1/t$ or a $1/t^2$. The images of each of the capture months can be automatically distributed to one or more calendar months, wherein the calendar months that the images are distributed to can have the same chronological sequence as that of the capture months associated with the images. The images of each of the capture months can be automatically distributed to one or more calendar months, wherein at least for some images, the calendar months that the images are distributed to do not have the same chronological sequence as that of the capture months associated with the images. The computer-implemented method can further include clustering images in at least one of the capture months based on events. The computer-implemented method can further include automatically assigning images taken at a milestone event in a capture month to the same calendar month. The computer-implemented method can further include automatically selecting one or more events in at least one of the calendar month to be included in the design of the photo calendar. The computer-implemented method can further include ranking the images in the time period; and selecting a portion of the images based on the ranking, wherein the portion of the images are automatically distributed to one or more calendar months according to an adjacency distribution function. The computer-implemented method can further include automatically creating a plurality of layouts for images distributed to the one of the calendar months. The computer-implemented method can further include automatically ranking the plurality of layouts for the one of the calendar months; and automatically selecting one of the plurality of layouts for the one of the calendar months based on the ranking of the layouts. The plurality of layouts can be ranked based on color, content, texture, line orientation, sky, ground, horizons, size or number of faces, or capture times of the images distributed to the one of the calendar months. The computer-implemented method can further include automatically specifying the time period by the computer processor. The computer-implemented method can further include providing the design of the photo calendar to a user for preview; and facilitating making of a hardcopy photo calendar based on the design in response to the user's command.

In another general aspect, the present invention relates to a computer system creating a creating a photo calendar. The system includes a storage medium configured to store images taken in a time period spanning a plurality of capture months; and a processor configured to automatically divide the images into groups based the capture months, distribute the images in one of the capture month to one or more calendar months according to an adjacency distribution function, and create a design of a photo calendar comprising a plurality of calendar months and images distributed in the calendar months.

Implementations of the system may include one or more of the following. The processor can resides in a user device or a remote system accessible via a computer network.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 11 shows exemplified distributing of photos in capture months to the same or different calendar months.

Figure 1:
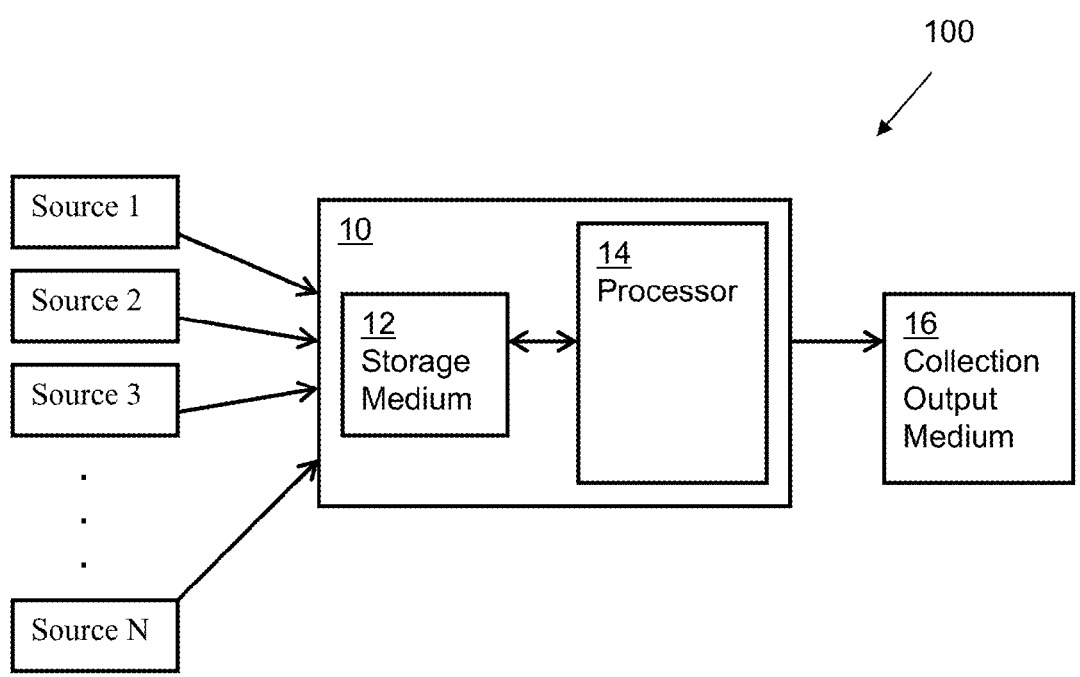
FIG. 1 is a schematic illustration of a system for creating a collection of images according to some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Reference is now made to FIG. 1, which is a schematic illustration of a system 100 for creating a collection of images according to embodiments of the present invention. System 100 may include a computer processor 10, which may include a storage medium 12 and a processor 14. The computer processor can be implemented as a standalone computer system or a computer server or an image processor at a remote network location. A standalone computer system can include a kiosk, a user computer (tablet, laptop, or desktop, etc.), and a mobile device such as smart phones. An example of a computer server or an image processor at a remote network location is shown below in FIG. 8. The computer processor 10 receives images from at least one of any number of various sources 1 to N. The received images may be stored in storage medium 12. The various sources 1 to N may include, for example, mobile or stationary storage devices, personal computers, digital cameras, mobile devices such as mobile phones or tablets, online sharing websites and/or any other source or device having images stored in any supported digital format thereon. Storage medium 12 may include any non-transitory computer-readable data storage media, wherein the term non-transitory computer-readable media includes all computer-readable media except for a transitory, propagating signal. The uploading of images from various sources 1 to N to storage medium 12 may be performed by, for example, dedicated software installed on various sources 1 to N. In some embodiments of the present invention, the dedicated software may upload images to the computer processor 10 automatically or upon request by a user. For example, the dedicated software may automatically upload all the images stored on the respective device. In some embodiments, once the dedicated software is installed on a device, every image, once stored on the device, is automatically uploaded to the computer processor 10. In some embodiments of the present invention, a digital camera may have dedicated software installed thereon, which may upload photos, for example, directly to the computer processor 10, by wireless connection (such as Wi-Fi connection or another form of wireless connection), automatically or upon request by a user. Similarly, in some embodiments of the present invention, mobile devices such as mobile phones or tablets may have dedicated software applications installed thereon. Additionally, in some embodiments of the present invention, the computer processor 10 may interface with online photo sharing websites for uploading into the computer processor 10 images stored on the websites. In some embodiments, the dedicated software, applications and/or interfaces mentioned above may reduce the size of the uploaded images for expediting the upload and for reducing the volume occupied by the images stored in storage medium 12.

A user's images stored in storage medium 12 may be processed by processor 14, which may output the images classified to clusters of related images and/or to chapters of related images, each chapter may include several clusters of related images, and the best and/or preferred images within each cluster may be indicated. The resulting output collection of images, which may include the classified clusters, chapters and/or indication of best/preferred images, may be outputted to a collection output medium 16, which may include, for example, directories of a local hard drive and/or another mass-storage device, for example, of a user's personal computer, online automated image printing services, offline image printing services such as photo printing services in retail stores, online photo sharing services/platforms, digital photo frames and/or any other suitable output medium.

Figure 2:
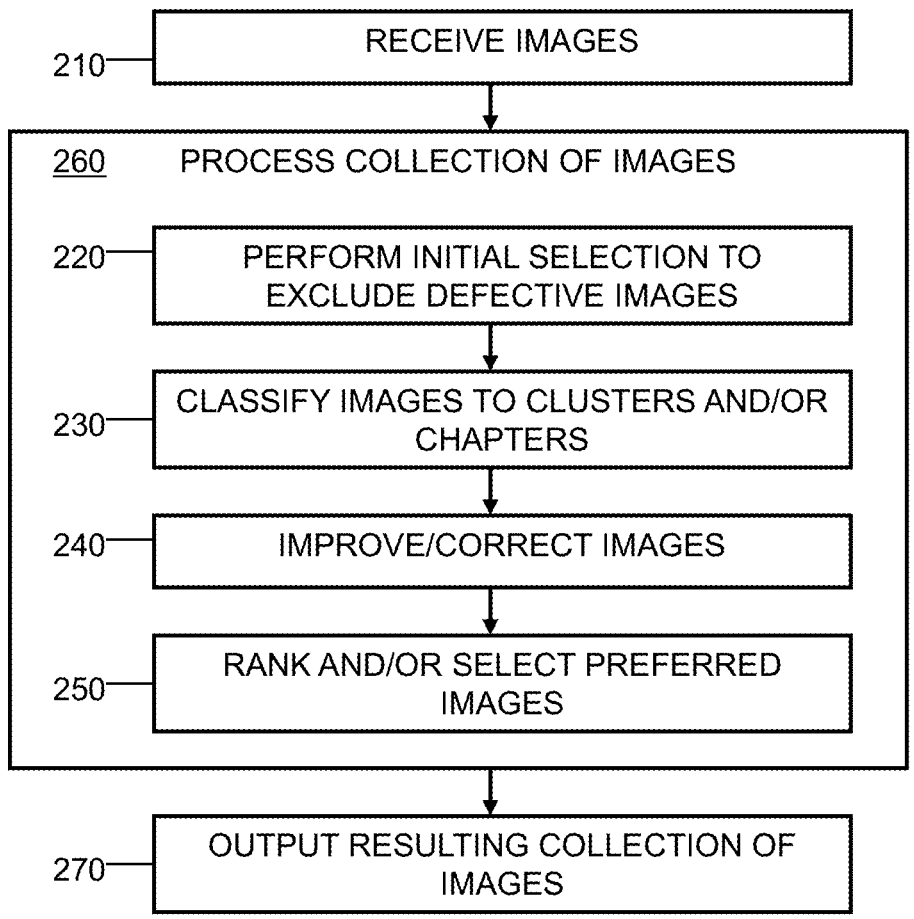
FIG. 2 is a schematic flowchart illustrating a method for creating a collection of images according to some embodiments of the present invention.

Reference is now made to FIG. 2, which is a schematic flowchart illustrating a method for creating a collection of images by system 100 described above, according to some embodiments. As indicated in step 210, the method may include receiving images, for example, from at least one of various sources 1 to N. The received images may be stored in storage medium 12, as described in detail above.

As indicated in step 260, the method may include processing the collection of images, for example by processor 14. As indicated in step 220, the processing by processor 14 may include initial selection in order to exclude defected images such as, for example, corrupted images and/or images under a certain threshold of optical quality parameters. Then, processor 14 may create the output collection of images by classifying the images into clusters and/or chapters and/or by indicating the best/preferred images in each cluster. First, as indicated in step 230, processor 14 may classify images into clusters and/or chapters. For clustering and/or chaptering the images, processor 14 may use statistical analyses (such as, for example histogram analyses) along with other tools such as, for example, computer vision technologies, face detection, face recognition, object detection, object recognition and other technical analysis methods in order to make successful image classifications.

Classification of images to clusters of related images may be performed based on a combination of parameters, which may include parameters from the following non-exhaustive list: time of capture, location of capture, colors, recognized identity of people in the image, number of people, location(s) of people/objects in the image and recognized objects in the image. The classification may be based on a certain hierarchy of the involved parameters, which may be decided by processor 16 and/or dictated, fully or partially, by a user.

The classified clusters of related images may, for example, facilitate better organized viewing of an image collection, may constitute a basis for easier and/or more effective selection of best/preferred images and/or may constitute a basis for automated design of pages and/or albums.

Then, as indicated in step 250, processor 14 may automatically select the best/preferred images, with or without user's input, and/or automatically rank the images and/or clusters according to various criterions that may, for example, be adjusted by a user, as described in detail herein below with reference to FIG. 6.

Additionally, as indicated in step 240, before and/or after selection of best/preferred images, processor 14 may perform image corrections and/or improvements such as, for example, contrast and brightness enhancement, gamma corrections, etc., which may be performed using properties of the complete picture, such as, for example, intensity, color histogram and/or according to any method known in the art. According to some embodiments, the image processing for correction/improvement may focus mainly on certain parts of the image such as on faces, people or certain objects, and may include, for example, improvements to the contrast, brightness, colors and/or focus. Additionally, according to some embodiments, the correction/improvement process may include cropping of images, for example, in order to make the main object(s) and/or person(s) more noticeable and/or centered in the image. For example, an image may be cropped to produce a portrait image of a face/person/object, with or without some area around the face/person/object, or to produce a full or half body image. In another example, an image may be cropped to remove dead zones and/or excessive edges of the image, so that, for example, a main portion of the image is centered or located in a noticeable portion of the image, such as, for example, one of the "golden ratio" positions or "rule of thirds" positions known in the art.

As indicated in step 270, the resulting output collection of images, which may include the classified clusters, chapters and/or indication of best/preferred images, may be outputted to a collection output medium 16. Collection output medium 16 may print the output collection of images and/or produce printed, electronic and/or online albums and/or photo books based on the output collection of images.

Figure 3:
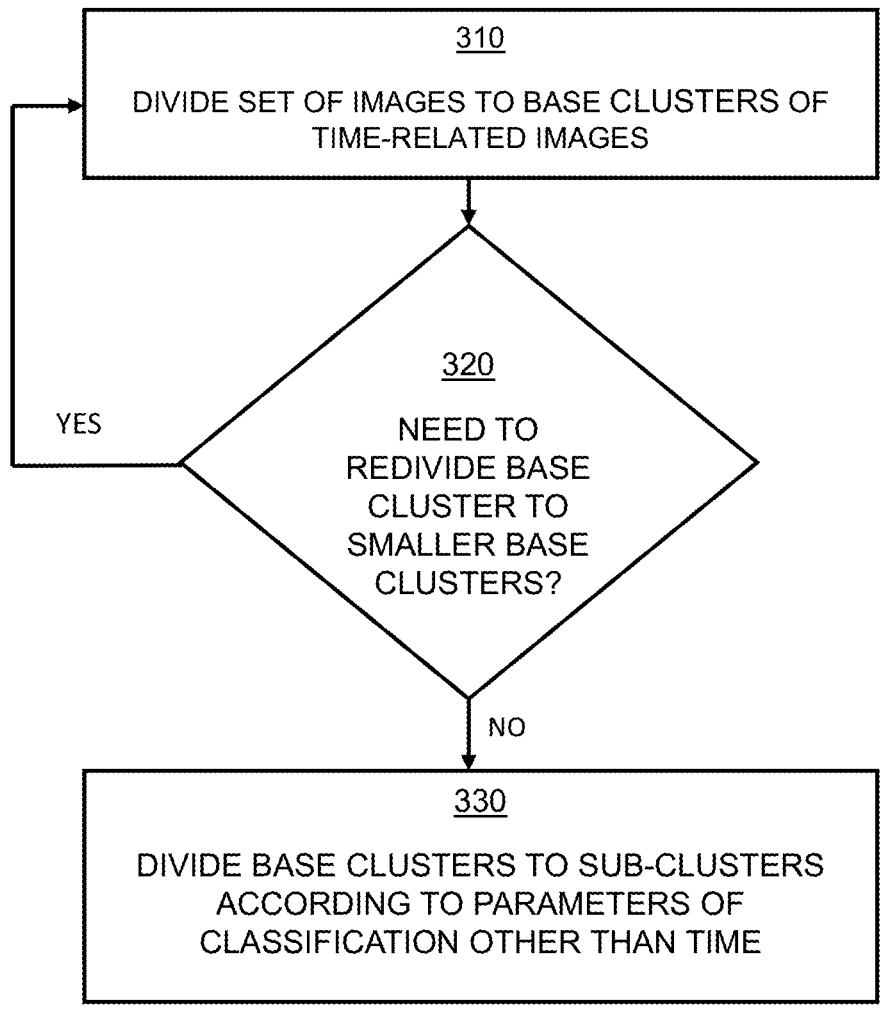
FIG. 3 is a schematic flowchart illustrating a method for clustering images based on time-hierarchy, according to some embodiments of the present invention.

In some embodiments, the classification of images into clusters may be based on a time hierarchy clustering according to embodiments, as described in detail herein below. Reference is now made to FIG. 3, which is a schematic flowchart illustrating a method for clustering images based on time-hierarchy.

In a time hierarchy clustering according to embodiments, as indicated in step 310, the images may be first clustered to groups of successively captured images according to the time differences between the capture times of successive images, to create base clusters of time-related images. For example, a set of images taken in relatively high rate after and/or before a long cease (for example, relative to the high rate) may be grouped into a base cluster of time-related images.

For example, in a batch of images, a series of successive images may have relatively small time difference between the capture times of each two successive images, and relatively large time difference between the capture time of the last image in the series of successive images and the capture time of the next image that comes after the series of successive images. In this case, the series of successive images may be classified in a base cluster of time-related images. The next image that comes after the series of successive images may, for example, belong to another base cluster of time-related images or, in some cases, be isolated time-wise and/or constitute a base cluster of one image. The determination of which time differences are relatively small and which time differences are relatively large may be performed by statistical analysis, which may be performed, for example, by processor 14. The differentiation between small and large time differences may be different for different batches of images and/or for different portions of batches of images, for example, according to particular statistical analyses.

For example, for a set of images, the largest time differences can be found. For example, the largest time differences can be defined as the time differences dT in the range $A*dT_{max} < dT < dT_{max}$, wherein $dT_{max}$ is the maximal time difference in the set of images and A is a constant factor between 0 to 1. In most cases, the value of A may be set between 0.3 and 0.8, and may be determined by trial and error and/or by machine learning, in order to find for a specific case the value of A which enables finding the most effective time differences range defined above. In typical cases, the preferred value of A may be set to about 0.6, for example, as default number. Then, the mean time difference value B in the range of largest time differences and the standard deviation S can be determined. Accordingly, the range of largest time differences can be redefined as $B-M*S < dT < B+M*S$, or more accurately as B−M*S<dT<dTmax, wherein M is constant factor between 1 to 3, which may be determined by trial and error and/or by machine learning, in order to find for a specific case the value of M which enables finding the most effective time differences range. In typical cases, the preferred value of M may be set to about 1.5, for example, as default number. |The time differences in this redefined range are used as cluster splitters, i.e. time differences that separate between clusters of time-related images.

As indicated in step 320, if required, a base cluster of time-related images may be further divided to smaller time-related base clusters, for example, according to more particular statistical analyses. For example, if there are changes in image capturing rate within a base cluster, a particular statistical analysis may identify, within the base cluster, a set of images taken in relatively high rate, i.e. small time differences between the images in the set, after and/or before a long cease (for example, long relative to the short time differences between images in the set), which may be grouped into a smaller base cluster of time-related images. For example, if the number of images in a base cluster is larger than a certain predetermined number, for example, 15 images, the statistical calculation described above may be repeated for this base cluster to further divide the base cluster to smaller base clusters of time related images. In another example, if the maximal time difference between two images in this base cluster is larger than a certain predefined threshold value, for example, 1800 seconds, the statistical calculation described above may be repeated for this base cluster to further divide the base cluster to smaller base clusters of time related images.

Further according to some embodiments, as indicated in step 330, a base cluster of time-related images may be further divided to sub-clusters according to parameters of classification other than time, such as the parameters of classification mentioned above with reference to FIG. 2. The classifications may be based, for example, on image analysis and processing abilities of processor 14, which may include color analysis and/or comparisons in various color spaces, object recognition, face recognition, and other measurements, calculations and analysis abilities. The image analysis and processing abilities of processor 14 may enable recognition of parameters such as, for example, locations, people, faces, objects, orientations (of, for example, people, faces and/or objects), color distributions and/or patterns in the image, and/or calculations of parameters such as, for example, number of people and/or number of recognized objects in the image. The recognized and/or calculated parameters may be used for classifying the images into clusters and/or chapters.

For example, images which are greatly similar, for example with difference below a certain determined threshold in various parameters of the image, may be grouped in a sub-cluster. In another example, images which include the same people may be grouped in a sub-cluster. According to some preferences, for example, of a user and/or automatic preferences, images which have all the people/objects in common or some of the people/objects in common or, for example, above a certain number of people/objects in common may be grouped in a sub-cluster. Further sub-clustering may be performed, for example, based on number of people present in the picture, a certain person or persons present in the images (for example, dominant, central and/or main people according to automatic recognition and/or user preferences), presence of a main object or objects (according to automatic recognition and/or user preferences) and/or based on the locations and/or directions in which the images are captured.

Figure 4:
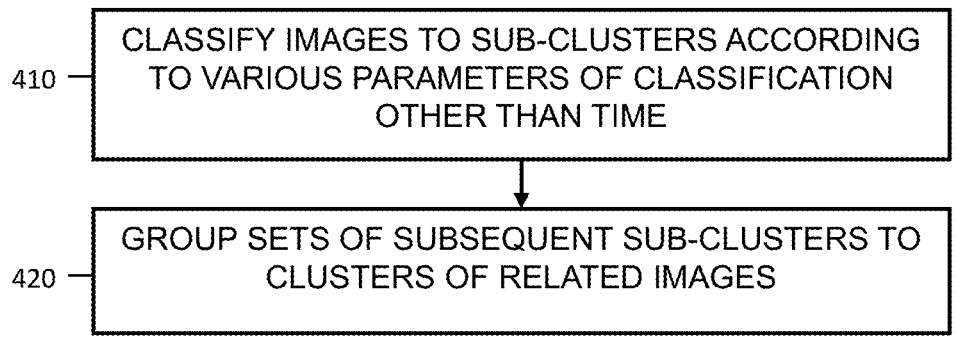
FIG. 4 is a schematic flowchart illustrating a method for clustering images with no capture time metadata, according to some embodiments of the present invention.

For images with unknown time of capture, for example images with no capture time metadata, the classification of images into clusters according to embodiments may be based on other parameters, and based on the assumption that the images are ordered chronologically, i.e. according to the time of capture. In some embodiments, the images may be first classified to sub-clusters according to various parameters, and then sets of subsequent sub-clusters may be grouped to clusters of related images, for example, according to average color analysis. Reference is now made to FIG. 4, which is a schematic flowchart illustrating a method for clustering images with no capture time metadata. As indicated in step 410, the images may be classified to sub-clusters according to various parameters of classification other than time, similarly to the classification to sub-clusters described in detail above with reference to step 330 in FIG. 3. For example, based on image analyses by processor 14, a topological space of various image parameters as detailed above may be calculated, and the topological distance between subsequent images may be calculated, based on differences in parameters between subsequent images. Separation between sub-clusters of images may be performed where the topological distance between subsequent images is larger than a certain determined threshold. The determination of the threshold may be performed by statistical analysis, which may be performed, for example, by processor 14. The threshold may be different for different batches of images and/or for different portions of batches of images, for example, according to particular statistical analyses. Then, as indicated in step 420, sets of subsequent sub-clusters may be grouped to clusters of related images, for example, according to average color analysis. For example, the average color analysis of several subsequent sub-clusters may be compared, and subsequent sub-clusters with similar average color, for example, with difference in average color below a certain threshold, may be grouped to a cluster of related images. Additionally or alternatively, the sub-clusters may be grouped to clusters of certain size or up to a certain size. For example, the sub-clusters may be grouped to clusters of between 10 to 15 images, or, for example, clusters of up to 15 images.

The clusters obtained by the processes described above can be grouped to chapters of related clusters. In some exemplary embodiments, a large cluster of time-related images, obtained as described above with reference to step 310 in FIG. 3, may be defined as a chapter, for example if it includes more than a predetermined number of images. Additionally or alternatively, clusters may be arbitrarily grouped into chapters, wherein each chapter includes images from a different period of time, for example a different month, and/or a different geographical location.

Figure 5:
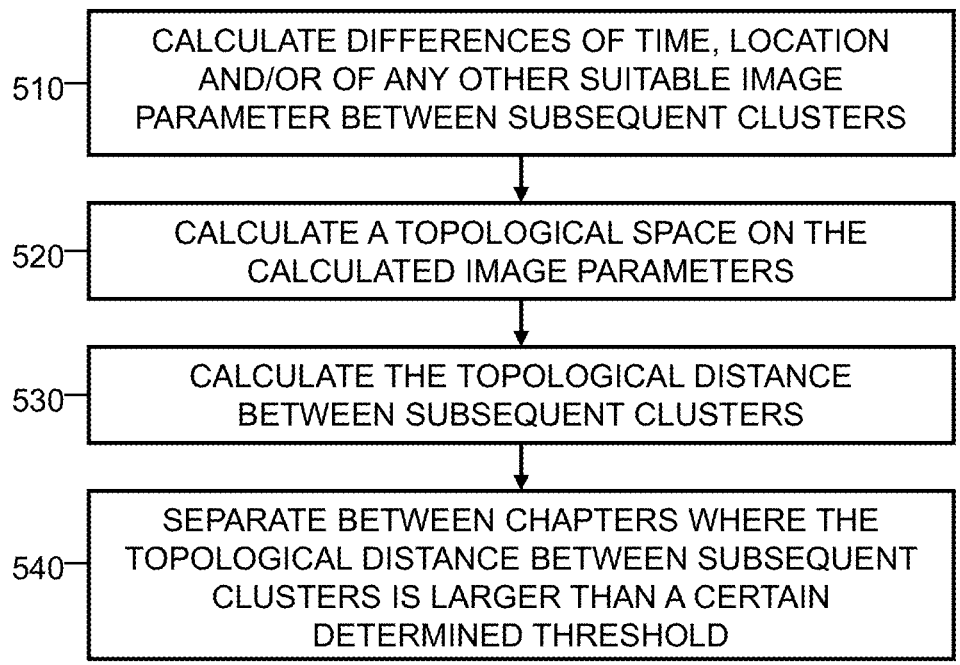
FIG. 5 is a schematic flowchart illustrating a method for grouping clusters into chapters according to various differences in parameters, according to some embodiments of the present invention.

Additionally or alternatively, in some embodiments, the clusters of related images obtained by the processes described above can be grouped to chapters, for example, according to time and/or location criterions, preferably time and location criterions combined together, which may, for example, relate the groups of clusters to an event and/or scene in which the images were taken. Reference is now made to FIG. 5, which is a schematic flowchart illustrating a method for grouping clusters into chapters according to various differences in parameters, such as differences in time and/or location of capture, according to embodiments. The chapters may be created using information about parameters of each image, for example time and location (for example, GPS data) metadata of each image and/or information about time, location of capture and/or other parameters obtained from other sources. Each of the created chapters may include clusters of images which are relatively similar in time, location and/or any other suitable parameter. As indicated in step 510, the method may include calculation of differences of time (in time units), location (in distance units) and/or of any other suitable parameter between subsequent clusters. As indicated in step 520, the method may include calculation of a topological space based on the calculated image parameters, i.e. multi-dimensional curve that indicates, for example, time differences versus geographical differences between subsequent clusters and optionally versus additional/alternative variables such as, for example, differences of average color and/or set of dominant colors and/or color histograms and/or differences of identity and/or number and/or locations of photographed people. For example, histograms of time difference, location difference, and/or other variable differences between subsequent clusters may be calculated, based on which the topological space may be obtained.

The topological distance between subsequent clusters along the topological space may indicate the combined dissimilarity between the clusters, taking into account all the variables that constitute the topological space. A larger topological distance between subsequent clusters may indicate a larger combined dissimilarity between the clusters. As indicated in step 530, the method may include calculating the topological distance between subsequent clusters, based on the calculated differences in parameters. As indicated in step 540, the method may include separating between chapters where the topological distance between subsequent clusters is larger than a certain determined threshold. The determination of the threshold may be performed by statistical analysis, which may be performed, for example, by processor 14. The threshold may be different for different batches of clusters and/or for different portions of batches of clusters, for example, according to particular statistical analyses.

The separation into chapters may be performed in addition to separation according to time periods. For example, the clusters may be separated according to different months or days, and the clusters in each month or day may be separated into chapters. Additionally or alternatively, each chapter may be further divided according to time periods, for example, to separate day chapters, hour chapters, and/or other similar divisions.

Additionally, according to some embodiments of the invention, image management server 10 may output a suggested name tag for each chapter based on analysis of the chapter's content, and further based on previous name tags and/or naming conventions used by the present or optionally other users of the computer processor 10. For example, memory 12 may have stored thereon a data base of name tags and naming conventions used by users of the computer processor 10, which may be used by processor 14 for determining name tags for the separate chapters. For example, processor 14 may identify the locations, people, conditions and/or objects photographed in images of a certain chapter, and look in the data base for name tags and/or conventions used for the same and/or similar locations, people, conditions and/or objects.

In some embodiments, the separation into clusters and/or chapters and/or the naming of the chapters may be adjusted and/or changed by the user.

As mentioned above with reference to FIG. 2, the output collection of images outputted by the computer processor 10 may include indication of the preferred images in a cluster, for example based on ranking and/or selection performed by processor 14. Processor 14 may rank each photo in a cluster according to various parameters, for example in order to imitate human ranking of images, possibly by a self learning process for image ranking. Processor 14 may rank the photos based on various criteria, which may relate, for example, to photographed objects/people of interest, optical and/or composition quality of the image and/or the user's profile and/or preferences.

Figure 6:
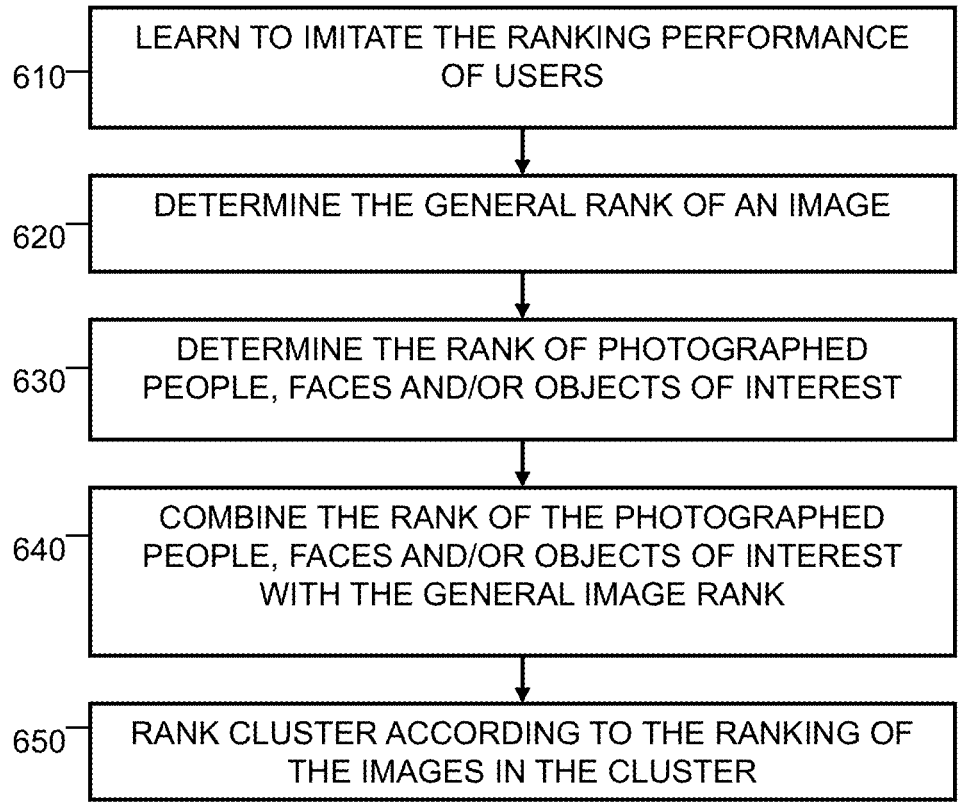
FIG. 6 is a schematic flowchart illustrating a method for image ranking within a cluster of images according to some embodiments of the present invention.

Reference is now made to FIG. 6, which is a schematic flowchart illustrating a method for image ranking within a cluster of images. In some embodiments, storage medium 12 may have stored thereon a database of previous rankings of the present user (i.e. the user that uploaded the currently processed images) and/or of other users of server 10. In order to determine the rank of an image, processor 14 may use the previous rankings of images with similar properties. As indicated in step 610, processor 14 may learn to imitate the ranking performance of users. In the beginning of the ranking process, processor 14 may receive a few ranks of images in a cluster from the present user, for example, in real time and/or pre-uploaded ranks, in order to learn the user's preferences. Based on the ranks received from the present user and the previous stored rankings, processor 14 may learn to imitate the ranking performed the various users and especially the ranking preferences of the present user. The more the present user provides rankings of images, the better processor 14 may imitate the ranking preferences of the present user. For example, processor 14 may ascribe higher weight to the present user's rankings than to rankings of other users.

As indicated in step 620, processor 14 may determine the general rank of an image. Processor 14 may rank the images based on parameters relating to general optical and/or composition quality of the image, such as, for example, parameters relating to focus, illumination, color, noise, location of the objects/people on the image, harmonization, composition and/or any other related parameters. Additionally, the images may be ranked according to preferences such as number of people/objects/faces in the image, colors, brightness and/or any other suitable preferences.

Additionally, as indicated in step 630, processor 14 may determine the rank of photographed people, faces and/or objects of interest. Processor 14 may identify objects and/or people of interest in the images, for example based on identification of objects and/or people in salient regions of the image or by any other suitable method. After identifying the main objects and/or people of interest, processor 14 may rank the images based on, for example, parameters relating to the optical quality of the relevant regions in the image, for example, such as focus, illumination, color, noise and/or any other related parameters, and/or parameters relating to the noticeability of the objects/people of interest in the image, for example, such as location of the objects/people on the image, harmonization, composition and/or any other related parameters. Additionally, in case the image includes people and/or faces, parameters relating to the people/faces may be used for ranking, such as, for example, the people/faces poses, expressions, haircuts, beauty (for example based on symmetry, golden ratios, etc.), orientations, visibility, locations, and/or any other suitable parameter. In some embodiments, the people, faces and/or objects of interest may be ranked separately and then, for example, the rank of the photographed people, faces and/or objects may be combined with the general image ranking, as indicated in step 640.

Additionally, as indicated in step 650, the clusters/sub-clusters may also be ranked, for example, according to the ranking of the images in the cluster/sub-cluster (for example, based on the ranking of the best-ranked image, the number of images with rank above a certain threshold and/or average ranking of the images in the cluster/sub-cluster), the size of the cluster and/or of sub-clusters, the required type of output collection of images and/or according to the face recognition results and/or any other suitable parameter. Processor 14 and/ or the user may adjust the selection and/or viewing of images based on the ranking of the clusters/sub-clusters, such as, for example, more images from a higher ranked cluster/sub-cluster may be selected and/or viewed.

Figure 7:
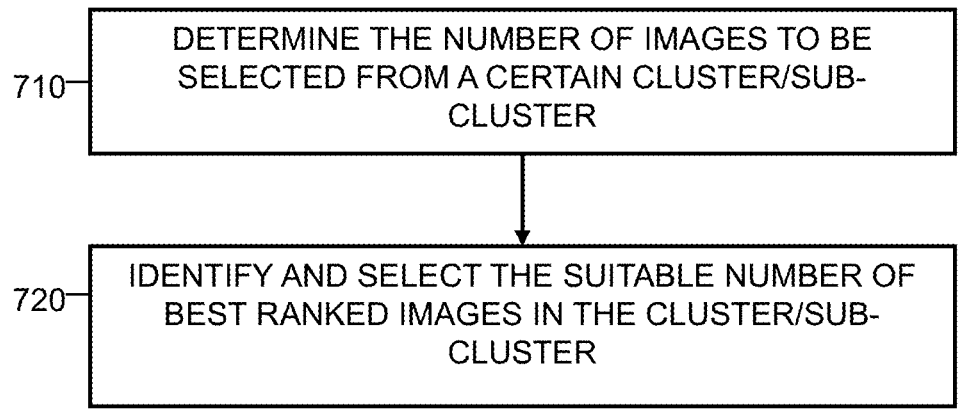
FIG. 7 is a flowchart illustrating a method for image selection from clusters according to some embodiments of the present invention.

Based on rankings of the images, the best and/or most preferred images may be selected by processor 14 for the output collection outputted by the computer processor 10. Reference is now made to FIG. 7, which is a flowchart illustrating a method for image selection from clusters. As indicated in step 710, the method may include determining by processor 14 the number of images to be selected from a certain cluster/sub-cluster. Processor 14 may select for example, the best-ranked image from each cluster and/or sub-cluster, or a predetermine number of best ranked images from each cluster and/or sub-cluster, or all the images with a rank above a certain determined threshold. In some embodiments, in case the cluster/sub-cluster includes very similar images, processor 14 may decide to select just one image, i.e. the best-ranked image in the cluster/sub-cluster, for example in case the rank of the best-ranked image in the cluster/sub-cluster is above a determined threshold.

Additionally, in some embodiments, the number of selected images from a cluster/sub-cluster may be influenced by the user's input which may be entered, for example, in real time and/or at the time of uploading the images or at any other suitable time. For example, the user may indicate the number of images required from a certain cluster/sub-cluster, for example, according to the content of the images in the certain cluster/sub-cluster and/or the ranking of the certain cluster/sub-cluster. Additionally or alternatively, the user may indicate that images which include certain indicated people and/or objects of interest should be printed more preferably, for example in case the rank of the image is above a determined threshold.

In some embodiments, other rules to determine the number of selected best images may be executed. In one exemplary embodiment, in case a cluster/sub-cluster includes images with the same people in different poses and/or head poses, a third of the number of images in the sub-cluster may be selected, for example as long as the rank of this number of best-ranked images in the cluster/sub-cluster is above a determined threshold. In another example, in case the cluster/sub-cluster includes images which are closely time-related and/or bear a high similarity, a fourth of the number of images in the sub-cluster may be selected, for example as long as the rank of this number of best-ranked images in the cluster/sub-cluster is above a determined threshold.

As indicated in step 720, according to the determination of the number of images to be selected, processor 14 may identify and select the suitable number of best ranked images in the cluster/sub-cluster.

Figure 8:
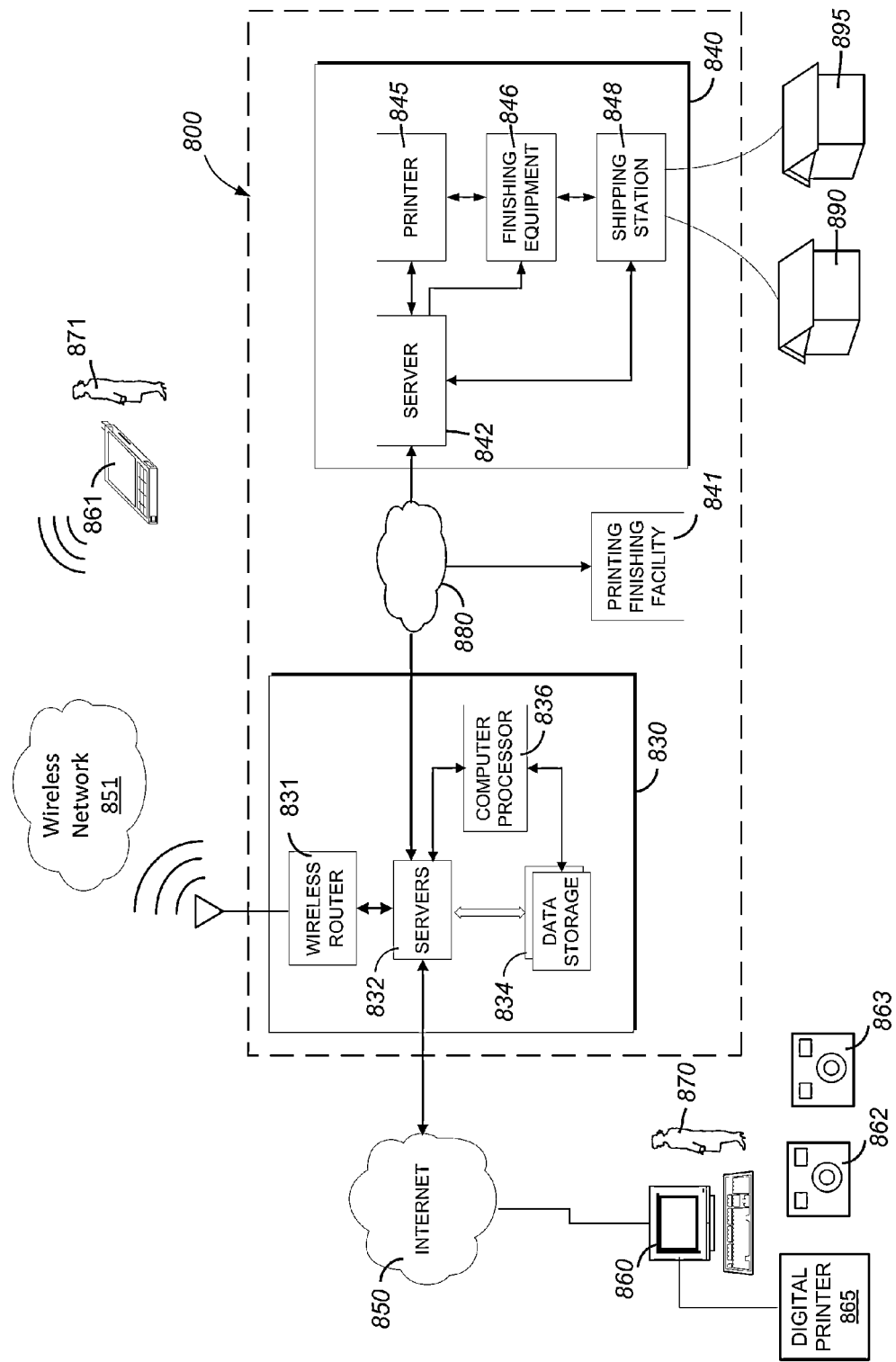
FIG. 8 is a block diagram of a network image service system for providing image services and image products in accordance to some embodiments of the present invention.
Figure 9:
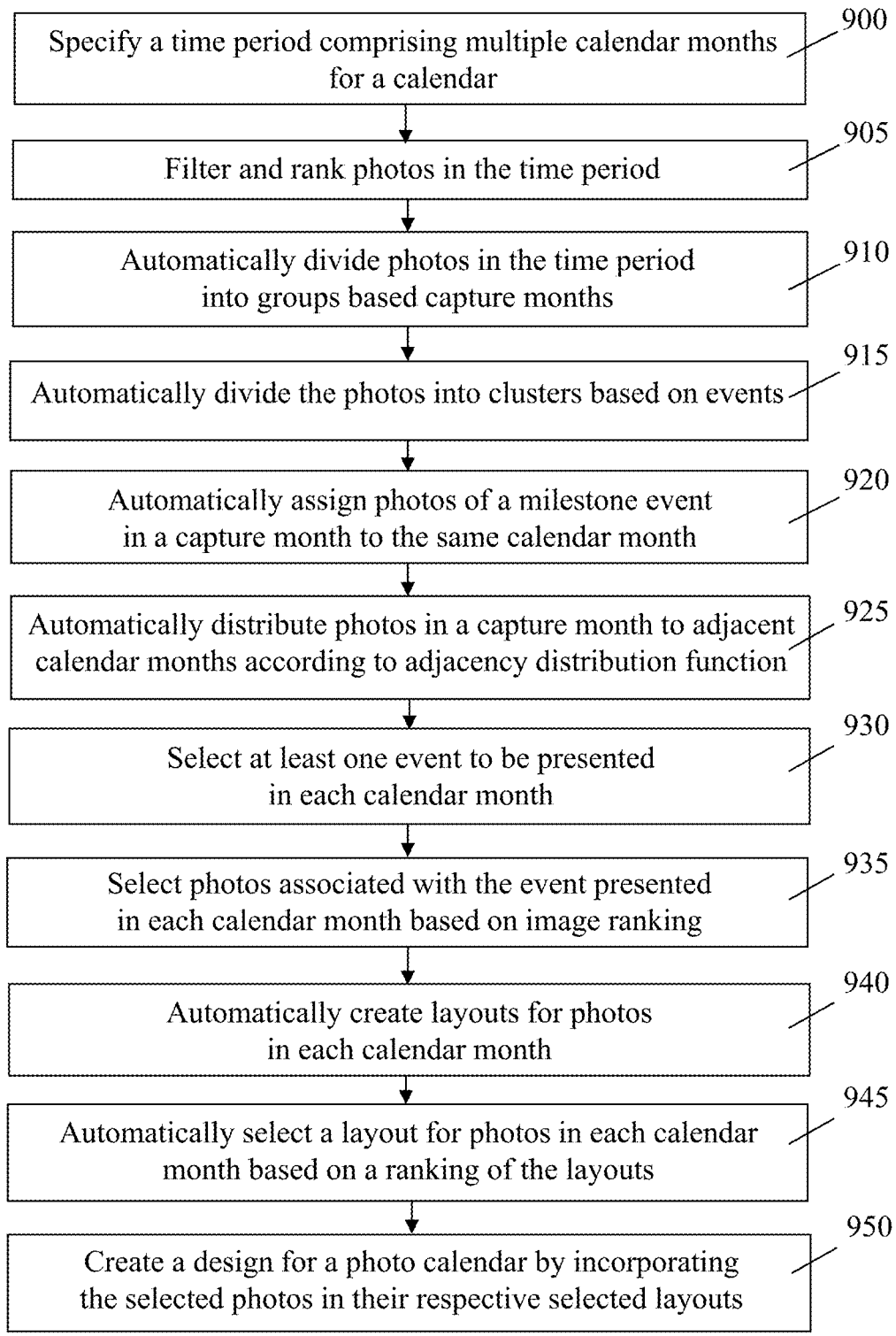
FIG. 9 is a flowchart for automatically creating a photo calendar.

Referring to FIG. 8, an imaging service system 800 can enable users 870, 871 to organize and share images via a wired network 850 or a wireless network 851. The imaging service system 800 can include a data center 830, one or more optional product fulfillment centers 840 and 841, and a computer network 880 that facilitates the communications between the data center 830 and the product fulfillment centers 840 and 841.

The data center 830 can include a server 832 configured to communicate with devices of the users 870, 871, a data storage device 834 for storing user data, image and design data, and a computer processor 836 for rendering images, organizing images, and processing orders. The user data can include account information, discount information, and order information associated with the user. A website can be powered by the servers 832 and can be accessed by the user 870 using a computer device 860 via the wired network 850, or by the user 871 using a wireless device 861 via the wireless network 851.

The imaging service system 810 can provide products that require user participation in designs and personalization. Examples of these products include the personalized image products provided by Shutterfly, Inc. In the present disclosure, the term "personalized" refers to the information that is specific to the recipient, the user, the gift product, and the occasion, which can include personalized content, personalized text messages, personalized images, and personalized designs that can be incorporated in the image products. The content of personalization can be provided by a user or selected by the user from a library of content provided by the service provider. The term "personalized information" can also be referred to as "individualized information" or "customized information".

Personalized image products can include users' photos, personalized text, personalized design elements, personalized styles, and content provided by a third party. Examples of personalized image products may include photo books, personalized greeting cards, photo stationeries, photo or image prints, photo posters, photo banners, photo playing cards, photo T-shirts, photo coffee mugs, photo pads, photo keychains, photo collectors, photo coasters, or other types of photo gifts or novelty items. Photo book generally refers to bound multi-page product that includes at least one image on a book page. Photo books can include photo albums, scrapbooks, bound photo calendars, or photo snap books, etc.

The user 870 or her family may own multiple cameras 862, 863. The user 870 transfers images from cameras 862, 863 to the computer device 860. The user 870 can edit, organize images from the cameras 862, 863 on the computer device 860. The computer device 860 can be in many different forms: a personal computer, a laptop, or a tablet computer, a mobile phone, etc. The camera 862 can include a camera that is integrated or connected with in the computer device 860. For example, laptop computers or computer monitors can include built-in camera for picture taking. The user 870 can also print pictures using a printer 865 and make image products based on the images from the cameras 862, 863. The cameras 862, 863 can include digital cameras, camera phones, video cameras capable of taking still images, laptop computers, and tablet computers.

The images obtained from the cameras 862, 863 can also be uploaded to the server 832 to allow the user 870 to organize and render images at the website, share the images with others, and design or order image product using the images from the cameras 862, 863. The wireless device 861 can include a mobile phone, a tablet computer, or a laptop computer, etc. The wireless device 861 can include a built-in camera (e.g. in the case of a camera phone). The images taken by the user 871 using the wireless device 861 can also be uploaded to the data center 830. If users 870, 871 are members of a family or associated in a group (e.g. a soccer team), the images from the cameras 862, 863 and the mobile device 861 can be grouped together to be incorporated into an image product such as a photo book, or used in a blog page for an event such as a soccer game.

The image product such as photo calendar, photobook, or photo greeting card can be locally produced, or ordered by the user 870, 871 from the data center 830 and then sent to product a fulfillment center 840, 841, which produces the ordered products, and deliver the addresses of recipient 890, 895 specified by the user 870, 871. The product fulfillment center 840 includes a server 842, and the storage and retrieving systems for pre-made off-the-shelf products. For the fulfillments of personalized image products, the product fulfillment center 840 can include one or more printers 845 for printing images, finishing equipment 846 for operations such as cutting, folding, binding the printed image sheets, and shipping stations 848 for verifying the orders and shipping the orders to the addresses of the recipients 890, 895. Examples of the printers 845 include can be digital photographic printers, offset digital printers, digital printing presses, and inkjet printers. The finishing equipment 846 can perform operations for finishing a complete image product other than printing, for example, cutting, folding, adding a cover to photo book, punching, stapling, gluing, binding, and envelope printing and sealing. The shipping stations 848 may perform tasks such as packaging, labeling, package weighing, and postage metering.

The user 870, 871 can access the online-photo website using the computer device 860 and the wireless device 861 using web browser or a client software application. The users 870, 871 can set up and access her personal account, user account information, and contact information. The user 870 can upload digital images to the online-photo website. The user can store images in an online photo album, create personalized image product, and order a personal image product and a gift product for specified recipients 890 and 895. The user 870 can design and order physical image products via the Internet using service provided by an online image service provider such as Shutterfly, Inc., located at Redwood City, Calif. The production of these image products often requires the use of commercial equipment available at the image product fulfillment system 840, 841.

After the image service provider has received the user's images, the image service provider can host the images on the online photo website, at which the user can view and access the images using a web browser or a locally installed software application. The user 870 can access the online-photo website to create and design an image product such as a photo book and a photo greeting card, and specify the images to be reproduced on an image product and parameters relating to printing (e.g., finish, size, the number of copies). The user 870 can also designate one or more recipients 890 and 895 to whom the image products are to be sent. The user can place an order of the image product with the image service provider. The information entered by the user 870 can be stored on the server 832 and the data storage 834, and subsequently transmitted to an image product fulfillment system 840 or 841. The image products are printed by the printer 845 and finished by finishing equipment 846 according to the printing parameters as specified by the user 870. The image products are then delivered to the specified recipients 890, 895.

In some embodiments, the system 100 (FIG. 1) and the imaging service system 800 (FIG. 8) can be configured to automatically create a design of a photo calendar using user's photos. Referring to FIG. 1, the computer processor (14 in FIG. 1 or 836 in FIG. 8) specifies a time period comprising multiple calendar months for a calendar (step 900). The time period can be automatically specified based on a predetermined criterion. For example, if a user has been making photo calendar every year, a photo calendar can be automatically created for a new year (e.g. from January, 2012 to December 2012) when the last photo calendar (e.g. for year 2011) is close to run out. In another example, if a large number of photos have been uploaded from a user from recent vacation trip, wedding, birthday parties, and graduation, etc., a new calendar can also be automatically created for a number of months (e.g. 3-18 months) based on the new photos detected. In some implementation, a set of albums can be selected by a user to be used in a photo calendar. The decision if to suggest the user with a calendar can be based on the time of the year, the amount and quality of the obtained or uploaded photos, the time-span between albums of the photos, and the type of the albums. For example, a calendar can be automatically created and recommend to a user who created a wedding album. Alternatively, the time period can be specified by a user at the time for the creation of a design for a photo calendar. The user can also schedule a photo calendar to be automatically created in advance: for example, creating a new photo calendar every December for the following year.

The time period for calendars can be 3 months, 6 months, 1 year, 12 months, 14 months, 18 months, 2 years, etc. In the present application, each month in the time period for the calendar is referred as the "calendar month".

User's photos are stored in the storage medium 12 (FIG. 1) or the data storage 834 (FIG. 8). The user's photos captured in the time period can be filtered to remove defected images as described in step 220 above (FIG. 2). Low quality photos are discarded. The user's photos captured in the time period are ranked according to image quality, appeal, and significance as described in step 250 above (FIG. 2) (step 905). The ranking of user's photos can also depend on faces detected or recognized in a photo. For example, recognized children's faces may carry higher significance than other photos.

User's photos that are captured within the period of time are automatically divided into groups based on the month in which a photo was captured, that is, based on "capture month" (step 910). In most image capture devices, image capture times including capture months are automatically saved and stored in metadata in association with each image. The image capture times in some image capture devices (e.g. digital cameras), however, are incorrectly recorded. In some other cases, the images received from the users are not stored with image capture times. In such cases, algorithms preinstalled on the processor 14 (FIG. 1) or the computer processor 836 (FIG. 8) can automatically correct image capture times and assign unified image capture times to images captured by different devices. For images without capture times, the processor 14 (FIG. 1) or the computer processor 836 (FIG. 8) can also intelligently determine and assign image capture times to these images. Details of correcting, determining, and assigning image capture times are described in commonly assigned pending U.S. patent application Ser. No. 13/603,181, titled "System and methods for intelligently determining image capture times for image applications", filed on Sep. 4, 2012, U.S. patent application Ser. No. 13/033,513, titled "Organizing images captured by multiple image capture devices", filed on Feb. 23, 2011, and U.S. provisional patent application No. 61/364,889, entitled "Organizing images captured by multiple digital cameras" filed Jul. 16, 2010. The disclosures in these patent applications are incorporated herein by reference.

Photos within each capture month are automatically divided into clusters (step 915) as described above in association with FIG. 2. Each cluster can be further divided into subclusters as described above in association with FIGS. 3 and 4. The clusters and the subclusters of photos can correspond to different events at which the photos were taken.

To assign photos to calendar months, photos taken at a milestone event that occur a capture month are first automatically assigned to the same calendar month (step 920). For example, Halloween photos are kept in the calendar month of October; Christmas photos stay in the calendar month of December; Hanukkah photos kept in December or January in which Hanukkah occurred (depending on the year), etc. The events can be identified by dates, keywords tagged to the photos, objects (pumpkin, Christmas tree or Santa Claus, Chanukah or Menorah lighting, etc.) automatically identified in the photos, and how the photos have been previously used (in Holiday, Christmas, or Hanukkah greeting cards), etc.

Figure 10A:
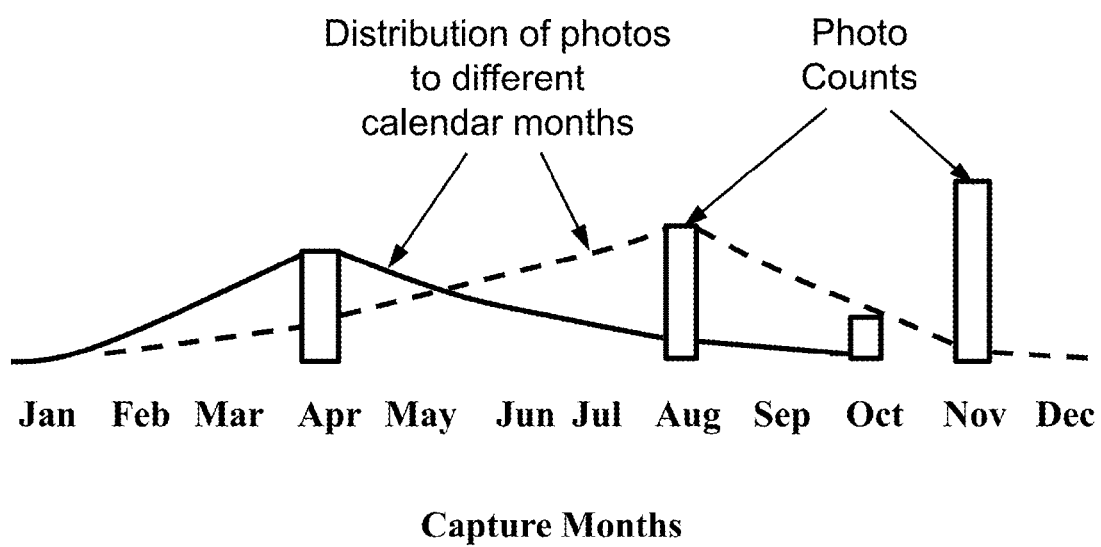
FIG. 10A shows exemplified photo counts over capture months and exemplified adjacency distribution functions for distributing photos of a capture month to different calendar months.
Figure 10B:
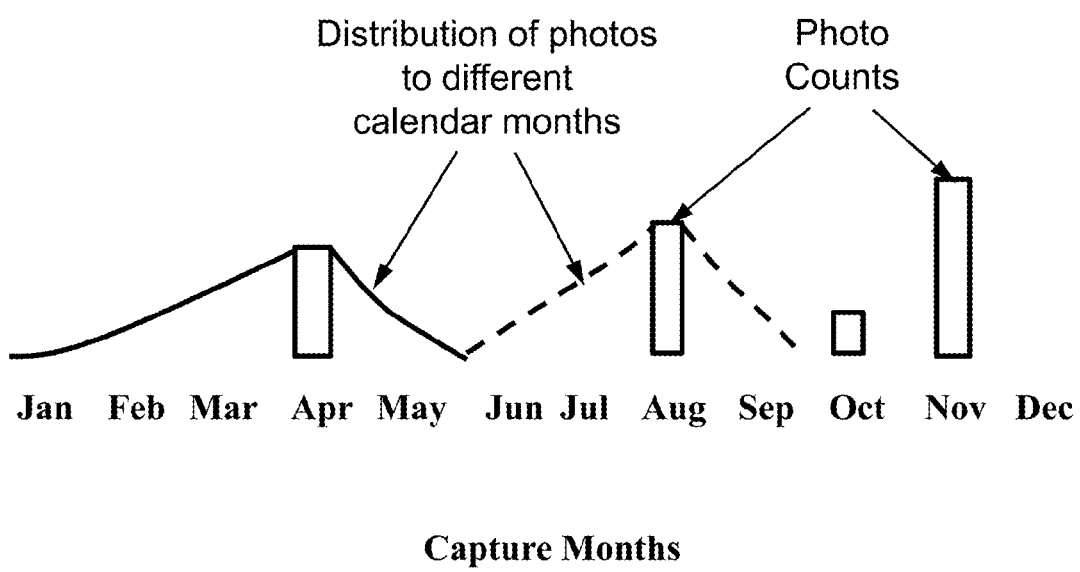
FIG. 10B shows exemplified photo counts over capture months and another example of exemplified adjacency distribution functions for distributing photos of a capture month to different calendar months.

Most often, user's photos are unevenly distributed across capture months. A user may have taken most of her photos in April (vacation), August (wedding and honey moon), and November (birthday). She or he may have taken fewer or no photos in other capture months. Exemplified monthly counts of photos taken by a user are shown in FIGS. 10A and 10B.

In accordance to the present invention, photos taken in a capture month can be automatically distributed to adjacent calendar months to allow all calendar months to incorporate appropriate photos (step 925). The distribution of photos from a capture month to adjacent calendar months can be based on according to adjacency distribution function as shown in FIGS. 10A and 10B. For purpose of clarity, adjacency distribution functions of photos captured only in April and August are shown in FIGS. 10A and 10B. The mapping of photos from capture months to calendar months is also shown in FIG. 11.

The adjacency distribution function can be governed by several logic rules: first, photos taken in an early part of a capture month can be mapped to early calendar months. For example, photos taken in the first half of April can be mapped to January, February, and March. Photos taken in the second half of April can be mapped to May, June and July. Secondly, a characteristic parameter is computed for the photos in each capture month. The characteristic parameter is a function of the number of photos in the capture month, number of events, time span of the events, and the number of best photos. The characteristic parameter is multiplied by adjacency distribution function to set the probability of the photos from the current capture month to be mapped on the other adjacent calendar months. In most cases, the adjacency distribution function decreases as a function of t, wherein t is difference between the capture time of an image and the calendar month the image to which the image is distributed to. For example, the adjacency distribution function can be a Gaussian function of t, or proportional to $1/t$ or $1/t^2$, etc. Finally, the photos selected for each calendar month are determined by the photos in the capture month with the highest weight. So for example if August has 5000 wedding photos, January has 200 photos from several events, May has 300 photos from several events, the wedding photos will be kept only in August (similar to the milestone photos) because the photos were is taken from one event with a small span, which carries a specific time signature for the calendar month.

In some embodiments, photos captured in an earlier month can be distributed to a later calendar month, while photos captured in a later month can be distributed to an earlier calendar month. As shown in FIG. 10A, the photos captured in April may be assigned to July, August, September, or October, while photos captured in October can be assigned to February to June, which are earlier calendar months than the photos captured in April are assigned to. In other words, the photos captured in different capture months can be cross assigned to different calendar months.

In some embodiments, photos captured in different months are only sequentially distributed to different calendar months. As shown in FIG. 10B, the photos captured in April may be assigned to as late as May, while photos captured in October can be assigned to as early as June, but not before the calendar months to which the April photos are assigned to. In other words, the capture months of the photos are chronologically preserved in calendar months; the earlier captured photos are always presented in earlier calendar months.

In some embodiments, if some batch of photos (e.g. from March) is unable to fill the needed empty months (e.g. January-February) but there is another much larger batch (e.g. at June) that can fill all the needed months, one should consider eliminating the smaller batch (from March) and use only the photos from the larger one (June) to fill all the empty month (January-June).

Photos of at least one event are selected to be presented in each calendar month (step 930). For example, if 5 photos are used in a calendar month, it was found that it is desirable to use photos from fewer events instead of five different events. For instance, all 5 photos can be taken at a same event or two events. It was observed that it is desirable to emphasize a main theme or subject in the photos displayed in association with each calendar month. In one implementation, in most cases, 1-5 photos are selected for each calendar month based on image ranking as described above (step 640, FIG. 6). The number of photos presented in a calendar month can also depend on the number of photos in adjacent/other calendar months. For example, it is aesthetically pleasing to have more variety in number of photos and layouts among different calendar months instead of having 5 photos of the same layout for all calendar months.

For each of the one or more events selected in each calendar, photos can be selected based on image ranking (step 935). Photos of best image quality, most appeal or significance, or most used can be selected within each of the selected event in each calendar month. The selection of photos are automatically performed by the processor 14 (FIG. 1) or the computer processor 836 (FIG. 8) based for example on image ranking as described above in step 640 (in FIG. 6).

Figure 12A:
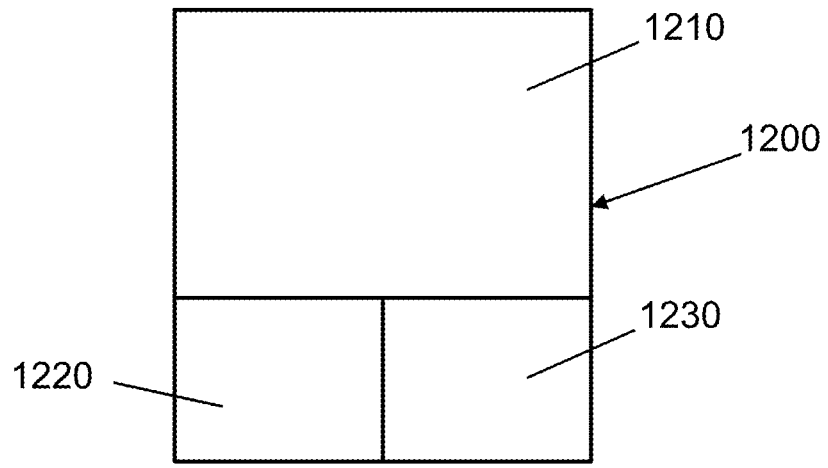
FIGS. 12A and 12B show exemplified layouts for photos to be incorporated in a calendar month.
Figure 12B:
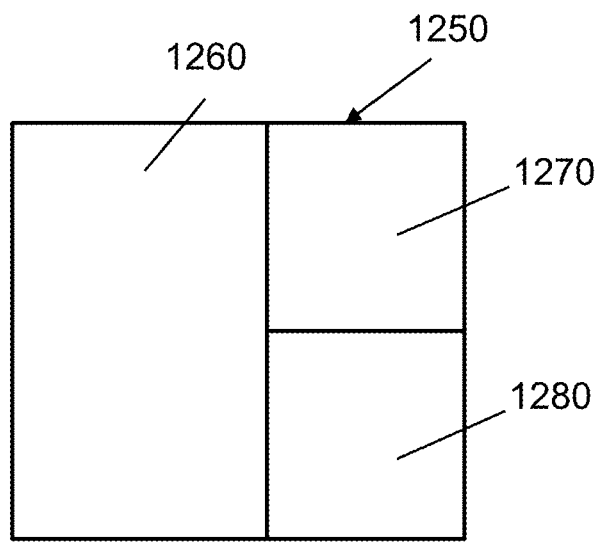

Layouts are automatically created for photos in each calendar month (step 940). For example, three photos are selected from an event and to be displayed in the calendar month of January. Two layouts 1200, 1250 are automatically created for the three photos as shown in FIGS. 12A and 12B. The layouts 1200, 1250 can be ranked based on the similarity and dissimilarities (color, content, texture, line orientation, sky, ground, horizons, etc.) among the selected photos. Design rules can be applied to select the right layout for a set of photos. The selected photos for the page are divided into groups based on color, content, texture, line orientation, sky, ground, horizons, number of faces, time etc. For each layout, the photo wells are divided into groups. For example, the layout 1200 in FIG. 12A has two groups of photos, a photo field 1210 and photo fields 1220-1230. The layout 1250 in FIG. 12B has two groups of photos, a photo field 1260 and photo fields 1270-1280. A ranking value is calculated for each photo combination for each of the layouts 1200, 1250 based on several factors such as: how well different groups match; whether the better photo is placed in the larger well; whether the area of interest of the photo is cropped correctly (area of interest is calculated based on people and objects positions); whether faces are too small to be clearly visualized, etc.

Figure 13:
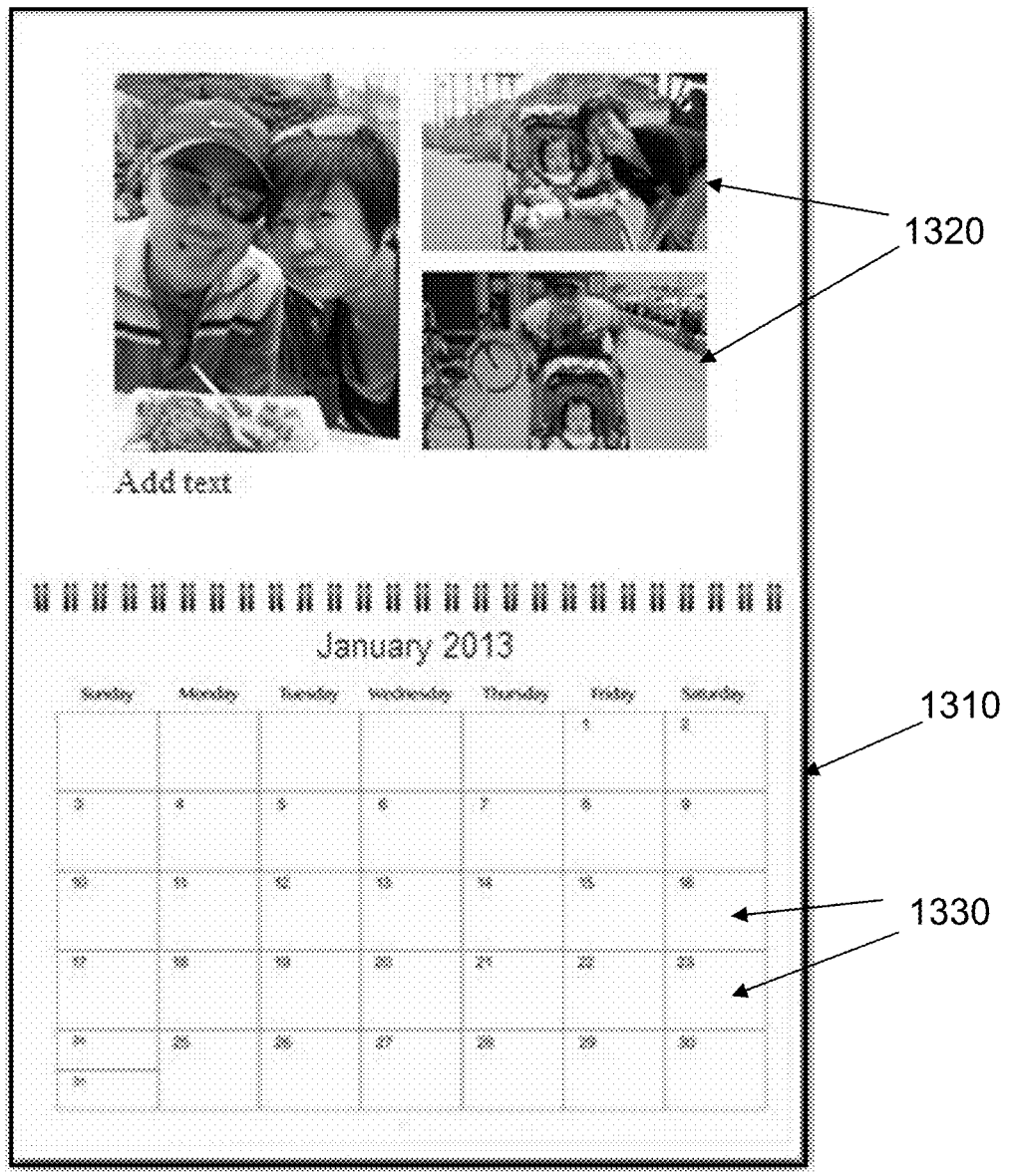
FIG. 13 shows a spread in an exemplified photo calendar.

A layout in each calendar month is then automatically selected based on a ranking of the layouts (step 945). A design for a photo calendar is automatically created by incorporating the selected photos in their respective selected layouts (step 950). FIG. 13 shows an example of a calendar month 1310, which includes photos 1320, and date cells 1330. The design of the photo calendar can be presented to a user for preview and editing. The user can order a physical copy of the photo calendar using process as described above.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A computer-implemented method for creating a photo calendar, comprising:
   storing, in a computer storage, images taken in a plurality of capture months;
   automatically creating a design of a photo calendar comprising a plurality of calendar months by a computer processor, wherein dates within each of the calendar months are to be associated with one or more of images in the design of the photo calendar;
   selecting a first image from the images stored in the computer storage;
   calculating differences between the capture month of the first image and the calendar months in the design of the photo calendar; and
   automatically distributing the first image to one of the calendar months in the design of the photo calendar according to an adjacency distribution function that decreases as a function of a difference between the capture month of the first image and the respective calendar month that the first image is distributed to.

2. The computer-implemented method of claim 1, wherein the adjacency distribution function comprises a Gaussian function of t, or proportional to $1/t$ or a $1/t^2$, wherein t is the difference between the capture time of the first image and the calendar month that the first image is distributed to.

3. The computer-implemented method of claim 1, wherein the capture month is adjacent to the respective calendar month that the first image is distributed to.

4. The computer-implemented method of claim 1, further comprising:
   automatically selecting a time period for the photo calendar by the computer processor, wherein the period includes the plurality of capture months.

5. The computer-implemented method of claim 1, wherein the images taken in the plurality of the capture months are automatically distributed to one or more calendar months according to the adjacency distribution function, wherein the calendar months that the images are distributed to have the same chronological sequence as that of the capture months associated with the images.

6. The computer-implemented method of claim 1, wherein the images taken in the plurality of the capture months are automatically distributed to one or more calendar months, wherein at least for some images, the calendar months that the images are distributed to do not have the same chronological sequence as that of the capture months associated with the images.

7. The computer-implemented method of claim 1, further comprising:
   ranking the images taken in the plurality of capture months; and
   selecting a portion of the images based on the ranking, wherein the portion of the images are automatically distributed to the calendar months according to the adjacency distribution function.

8. The computer-implemented method of claim 1, further comprising:
   automatically creating a plurality of layouts for images distributed to the one of the calendar months.

9. The computer-implemented method of claim 8, further comprising:
   automatically ranking the plurality of layouts for the one of the calendar months; and
   automatically selecting one of the plurality of layouts for the one of the calendar months based on the ranking of the layouts.

10. The computer-implemented method of claim 9, wherein the plurality of layouts are ranked based on color, content, texture, line orientation, sky, ground, horizons, size or number of faces, or capture times of the images distributed to the one of the calendar months.

11. The computer-implemented method of claim 1, further comprising:
    providing the design of the photo calendar to a user for preview; and
    facilitating making of a hardcopy photo calendar based on the design in response to the user's command.

12. A computer system for creating a photo calendar, comprising:
    a storage medium configured to store images taken in a plurality of capture months; and
    a processor configured to automatically create a design of a photo calendar comprising a plurality of calendar months, wherein dates within each of the calendar months are to be associated with one or more of images in the design of the photo calendar, to select a first image from the images stored in the computer storage, to calculate differences between the capture month of the first image and the calendar months in the design of the photo calendar, and automatically distribute the first image to one of in the calendar months in the design of the photo calendar according to an adjacency distribution function that decreases as a function of a difference between the capture month of the first image and the respective calendar month that the first image is distributed to.

13. The computer system of claim 12, wherein the adjacency distribution function comprises a Gaussian function of t, or proportional to $1/t$ or a $1/t^2$, wherein t is the difference between the capture month of the first image and the calendar month that the first image is distributed to.

14. The computer system of claim 12, wherein the calendar months that the images are distributed to have the same chronological sequence as that of the capture months associated with the images.

15. The computer system of claim 12, wherein the processor resides in a user device or a remote system accessible via a computer network.

16. The computer system of claim 12, wherein the processor is configured to cluster images in at least one of the capture months based on events and automatically assign images taken at a milestone event in a capture month to a same calendar month.

17. The computer system of claim 12, wherein the processor is configured to automatically select a time period that includes the plurality of capture months in which the images were taken.

* * * * *